United States Patent [19]

Lamarine et al.

[11] 4,038,463
[45] July 26, 1977

[54] ELECTRODE RESERVOIR FOR A FUEL CELL

[75] Inventors: John H. Lamarine, Coventry; Robert C. Stewart, Jr., Granby; Raymond W. Vine, Bolton, all of Conn.

[73] Assignee: United Technologies Corporation, Hartford, Conn.

[21] Appl. No.: 719,875

[22] Filed: Sept. 1, 1976

[51] Int. Cl.² .................................................. H01M 8/02
[52] U.S. Cl. .......................................... 429/44; 429/41
[58] Field of Search .............................. 429/41, 44, 39

[56] References Cited

U.S. PATENT DOCUMENTS 3,905,832  9/1975  Trocciola .............................. 429/39

Primary Examiner—John H. Mack
Assistant Examiner—H. A. Feeley
Attorney, Agent, or Firm—Stephen E. Revis

[57] ABSTRACT

An electrolyte reservoir layer disposed behind and adjacent one of the catalyst layers of a fuel cell is porous and hydrophilic to the electrolyte. In one embodiment the reservoir layer includes impregnations of hydrophobic material to provide reactant gas passages through the reservoir layer to the catalyst layer. Additionally the reservoir layer includes impregnations of a material similar to the fuel cell electrolyte retaining matrix material to improve electrolyte transfer from the matrix into the reservoir. The impregnations of hydrophobic material are designed to provide good distribution of the reactant gas into the catalyst layer without consuming a large volume of the reservoir. In a preferred embodiment the reservoir is also the electrode substrate whereby the catalyst layer is bonded to the surface thereof.

17 Claims, 3 Drawing Figures

ELECTRODE RESERVOIR FOR A FUEL CELL

RELATED APPLICATIONS

The following commonly owned U.S. Patent Applications were filed on even date herewith and include subject matter related to the present application:

"Electrolyte Reservoir for a Fuel Cell" by C. Bushnell and H. Kunz

"Electrolyte Reservoir for a Fuel Cell" by P. Grevstad

BACKGROUND OF THE INVENTION

1. Field of the Invention

This invention relates to fuel cells, and more particularly to electrolyte volume control within a fuel cell.

2. Description of the Prior Art

In a fuel cell, electrolyte is disposed between a pair of spaced apart electrodes. The electrodes often comprise a substrate and a catalyst; the substrate is provided simply to carry the catalyst and must be designed such that during operation the catalyst is in continuous contact with the electrolyte. The electrode must also be constructed to permit the reactant, such as gaseous hydrogen, to enter the substrate and also contact the catalyst. In the prior art it is generally considered that a three phase interface is formed between the reactant gas, the catalyst, and the electrolyte, at which place the electrochemical reaction occurs. Many early electrodes, such as those used in the cells described in U.S. Pat. Nos. 2,969,315 and 2,928,783 used porous nickel electrodes wherein the catalyst was distributed uniformly throughout the thickness of the entire electrode. These early cells incorporated a circulating electrolyte so that the water could be either added or removed external of the cell, thereby maintaining a relatively constant volume of electrolyte within the cell. In any event, small changes in electrolyte volume simply changed the location of the three-phase interface within the electrode substrate.

Later cells went to a noncirculating or trapped electrolyte disposed in a matrix sandwiched between the electrodes. In these cells water produced during operation is removed by evaporating it into one of the reactant gas streams. In order to reach the reactant gas stream water vapor must be able to pass through the electrode, yet one could not permit the electrode to completely fill with liquid since this might prevent the reactant gas from entering the electrode to react with the electrolyte at the catalyst sites. Efforts to avoid this type of problem resulted in the development of biporous electrodes. One such biporous electrode is described in U.S. Pat. No. 3,077,508 beginning at line 2 of column 4. As described therein, the biporous structure generally includes a large pore layer on the gas contacting side and a small or fine pore layer on the electrolyte contacting side. The fine pore layer would necessarily be activated with a catalyst. This might also be true of the large pore layer, although it is not a requirement. The high capillary action in the fine pore layer strongly held the electrolyte, while the large pore layer would remain relatively free from electrolyte and would therefore always permit the reactant gas to enter the electrode substrate. The electrochemical reaction took place at approximately the boundary between the large and small pore layers wherein a three-phase interface exists. However, the small pore layers of these early cells were generally very thin such that other provisions were required for electrolyte volume changes.

In an electrode having a catalyst uniformly distributed throughout the substrate it does not matter if, for example, the electrolyte fills half or three-quarters of the electrode thickness since there is always catalyst at the boundary between the electrolyte and reactant gas. Thus, it is only necessary that the reactant gas be able to penetrate through the portion of the electrode not filled with electrolyte. However, electrochemical activity only occurs at the three-phase interface, and catalyst not disposed at that interface does not react and is virtually being wasted. Further development led to electrodes wherein the catalyst was not dispersed throughout the entire substrate, but was rather applied as a very thin layer to the surface of the substrate adjacent the electrolyte. In that type of electrode it is required that there always be gas passageways extending all the way through the substrate to the catalyst layer. In order to ensure that the reactant gas reaches the catalyst layer, it has always been considered necessary to use a hydrophobic substrate which cannot hold significant electrolyte and therefore cannot block the passage of reactant gas through the substrate to the catalyst layer. This is the most common type of electrode in use today. However, in noncirculating electrolyte type cells, it is still necessary to remove excess water by evaporating it into one of the reactant gas streams and/or to be able to store excess electrolyte volume some place within the cell, particularly at shutdown when the water vapor within the gas streams condenses to a liquid. With hydrophilic substrates the condensed water vapor would increase the volume of the electrolyte and may form a film of liquid on the backside or inside the substrate which acts as a barrier to gas flow through the substrate when the cell is put back into operation.

Solutions to the above discussed problems are shown and described in commonly owned U.S. Pat. Nos. 3,779,811 and 3,905,832. In the former patent a porous electrolyte reservoir plate (ERP) is disposed in the reactant gas passage and is spaced from the electrode. Porous pins provide electrolyte communication between the porous plate and the electrode. The electrolyte volume of the cell is controlled by electrolyte movement through the pins of the porous plate, thereby stabilizing the electrochemical performance of the cell and preventing flooding of the electrode. Note that in the embodiment described therein the electrode comprises a conductive nickel screen emnbedded in a uniform admixture of platinum plus polytetrafluoroethylene particles thereby making the electrode basically hydrophobic. In the U.S. Pat. No. 3,905,832 patent hydrophilic material is disposed behind and in contact with a hydrophobic electrode substrate to act as an electrolyte reservoir. Communication between the reservoir material and the electrolyte matrix is provided by, for example, holes through the electrode filled with a hydrophilic material or by leaving discrete portions of the electrode substrate hydrophilic to provide wicking paths between the electrolyte matrix and the reservoir material. In this manner excess electrolyte has a place to go without significantly affecting the flow of gas through the hydrophobic areas of the substrate.

While the inventions described in the foregoing two patents work well, they have certain drawbacks. One drawback is increased cell thickness. Another is the increase in IR losses due to either reduced contact between the electrode and separator plate or by the addition of additional material through which the electric current must pass. Increased cost is another problem; this is not only due to the cost of the reservoir layer or material itself, but may also include increased electrode fabrication costs, such as would be required with the invention described in the U.S. Pat. No. 3,905,832 patent.

SUMMARY OF THE INVENTION

An object of the present invention is a fuel cell which can accommodate changes in electrolyte volume without flooding or drying out.

According to the present invention, an electrolyte reservoir layer for use adjacent the catalyst layer of a fuel cell is hydrophilic; a large portion but not all of the catalyst facing surface of the reservoir layer is impregnated with hydrophobic material to a shallow depth. The reservoir layer also includes additional nonelectrolyte retaining portions distributed substantially uniformly throughout the reservoir layer leading from the noncatalyst facing surface to the hydrophobic material at the other surface. Nonhydrophobic areas of the catalyst facing surface are impregnated with electrolyte matrix material to a substantial depth but in an amount only sufficient to fill a minor portion of the remaining hydrophilic volume of the reservoir layer.

Unlike electrochemical cells of the prior art, there is no need for separate hydrophobic and hydrophilic layers behind the catalyst. In this invention a large portion of the reservoir layer remains hydrophilic and can retain excess electrolyte. The nonelectrolyte retaining portions permit reactant flow to the catalyst layer adjacent the reservoir layer. The hydrophobic material which impregnates the catalyst facing surface permits diffusion of the reactant gas over a large area of the catalyst layer. The volume of the reservoir layer impregnated with matrix material will have a pore size similar to that of the electrolyte matrix and somewhat smaller than the pore size of the surrounding nonimpregnated hydrophilic areas; this aids wicking of the electrolyte from the matrix into the reservoir and better distributes the excess electrolyte throughout the reservoir. Preferably the matrix material extends from the matrix through the reservoir layer such that it is exposed to the reactant gas behind the reservoir layer; under certain conditions this construction helps wick excess liquid in the gas path back into the electrolyte matrix.

Some electrode substrate materials, such as carbon paper, which are highly desirable for use as phosphoric acid electrolyte reservoirs for phosphoric acid cells due to their inertness in the acid and good electrical properties, lose their hydrophilic characteristics with time. Thus, if the reservoir layers were carbon paper, the hydrophilic portions might become hydrophobic with time and the reservoir would lose its capability to store electrolyte. In the present invention part of the hydrophilic portions of the reservoir layer are impregnated with matrix material. Good matrix materials, such as silicon carbide, do not become hydrophobic with time. Thus, another advantage of the present invention is that at least the areas of the reservoir layer impregnated with the matrix material will always remain hydrophilic.

In a preferred embodiment the reservoir layer also functions as an electrode substrate, wherein the catalyst layer is disposed on the surface thereof and is bonded thereto.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
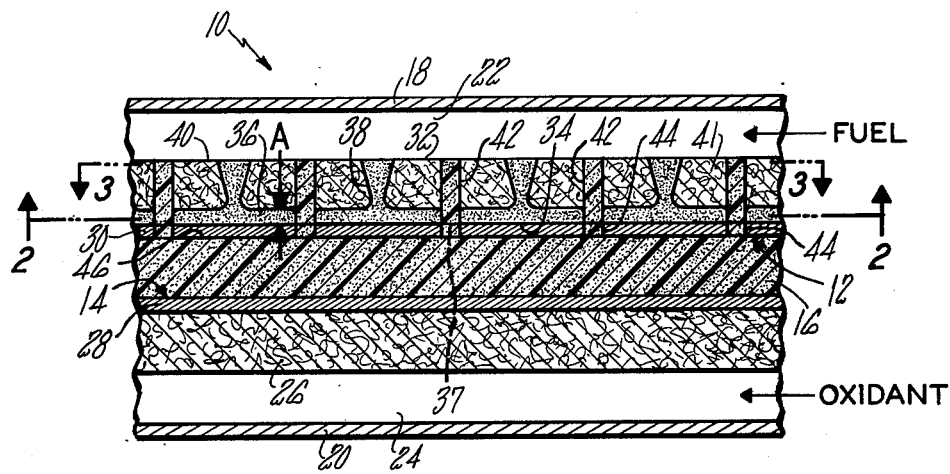
FIG. 1 is a transverse sectional view of an electrochemical cell incorporating the present invention.
Figure 2:
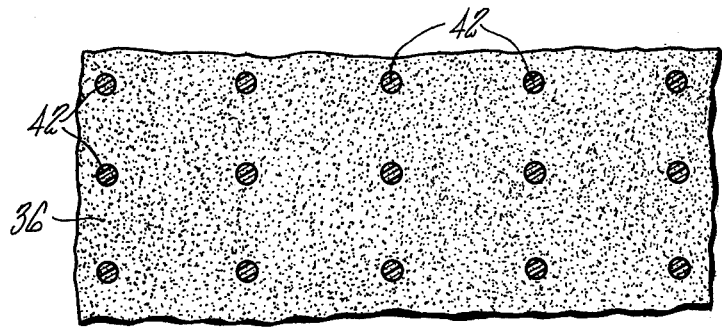
FIG. 2 is a sectional view taken along the line 2—2 of FIG. 1.
Figure 3:
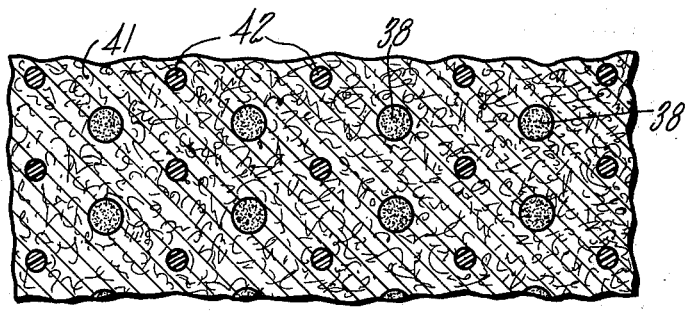
FIG. 3 is a sectional view taken along the line 3—3 of FIG. 1.

As an exemplary embodiment of the present invention consider the electrochemical cell 10 as shown in FIGS. 1-3. The cell includes a fuel or anode electrode 12, a cathode electrode 14, and electrolyte retaining matrix 16 sandwiched between the electrodes, and walls 18, 20 spaced from the electrodes 12, 14 and defining a fuel space 22 behind the anode electrode 12 and an oxidant space 24 behind the cathode 14. In a typical stack of fuel cells, wherein the individual cells are connected electrically in series, the walls 18, 20 may be electrically conductive separator plates having fuel flowing on one side thereof feeding the anode electrode of one cell and having oxidant flowing on the other side thereof feeding the cathode electrode of the adjacent cell. Such constructions are well known to those skilled in the art.

The cathode electrode 14 comprises a substrate 26 and a catalyst layer 28 bonded to the surface thereof. In this particular embodiment the cathode electrode 14 is simply a gas diffusion electrode of well known design. For example, assuming that the electrolyte in this embodiment is phosphoric acid, the catalyst layer may comprise an admixture of carbon supported platinum particles and polytetrafluoroethylene (PTFE). The PTFE binds the catalyst particles together and also prevents the catalyst layer from becoming flooded with electrolyte to the exclusion of the reactant gas necessary for the electrochemical reaction. The substrate 26 may be porous carbon paper impregnated with PTFE to make it basically hydrophobic so that it cannot completely fill with electrolyte and prevent reactant gas from reaching the catalyst layer 28.

The anode electrode 12 comprises a catalyst layer 30 and an electrolyte reservoir layer 32. The catalyst layer 30 is bonded to the reservoir layer 32 at the surface 34. The reservoir layer 32 is made from porous material which is hydrophilic to the electrolyte or which has been treated so that it is hydrophilic to the electrolyte. For example, it may be made from carbon paper if the electrolyte is phosphoric acid; or it may be a porous plaque made of silver felt metal, sintered powdered silver, gold or other metal if the electrolyte is a base such as potassium hydroxide. The pores of the reservoir layer material should be no smaller than and preferably somewhat larger than the largest pores of the matrix 16 so that only excess electrolyte wicks into and is stored in the reservoir layer 32.

The surface 34, adjacent the catalyst layer 30, is impregnated to a depth A over a major portion of its area with a hydrophobic material or wetproofing agent such as PTFE. This hydrophobic portion is designated by the numeral 36 (FIGS. 1 and 2) and in this embodiment is only interrupted by small circular nonwetproofed areas 37. The reservoir layer 32 also includes a plurality of columns 38 of hydrophobic material leading from the noncatalyst facing surface 40 of the reservoir layer 32 to the hydrophobic portion 36. Since the reservoir layer 32 will always be at least partially filled with electrolyte, the colums 38 and portion 36 guarantee a clear path for the reactant gas or fuel to reach the catalyst layer 30. Also, the gas will diffuse radially outwardly from the columns 38 into the hydrophobic portion 36 thereby being distributed over a large area of catalyst. The hydrophobic area of the surface 34 should be as large as possible so as to maximize utilization of the catalyst in the layer 30. Probably at least 50 percent of the surface will have to be wetproofed in order to obtain satisfactory catalyst utilization and cell performance, although greater than 90% is preferred. With regard to the maximum amount of area which may be wetproofed, the limiting factor is that the nonwetproofed areas 37 (FIG. 2) must have enough surface area to permit ready transfer of the electrolyte between the matrix 16 and the hydrophilic portions 41 of the reservoir layer 32. It is estimated that at least about 2 percent of the surface area of the surface 34 will have to remain nonwetproofed. Also, the nonwetproofed areas 37 should be uniformly distributed over the surface 34; however, the shape of the nonwetproofed areas 37 is not critical. For example, the hydrophobic portion 36 may instead be a plurality of separate rectangular areas with the nonwetproofed areas being the spaces between the rectangles and forming an interconnecting grid.

From the point of view of weight, size, and perhaps cost, it is desirable to make the reservoir layer 32 as thin as possible, yet thick to absorb and hold the maximum amount of excess liquid which the cell may be expected to produce. With this in mind, it is apparent that the volume of the nonelectrolyte retaining portions (i.e., columns 38 and hydrophobic portion 36) should be as small as possible. Thus, the depth A of the portion 36 should be no greater than is necessary to permit ready radial diffusion of the reactant gas from the columns 38 into the portion 36. A minimum of about 3 mils in depth will probably be required; however, depths of up to 50 percent of the reservoir layer thickness may be acceptable in some instances. In order that sufficient reactant gas reaches the catalyst layer 30, it is estimated that the sum of the minimum cross-sectional areas of the columns 38 should be at least about 2% of the total area of the surface 40.

As a further aspect of the present invention the reservoir layer includes an impregnation of matrix material 42 extending from the nonwetproofed areas 37 at the surface 34 into the hydrophilic portion 41. The catalyst layer 30 inclludes holes 44 corresponding to the areas 37; these holes are filled with matrix material such that there is a continuous path of matrix material from the surface 46 of the matrix 16 to the surface 40 of the reservoir layer 32. The holes 44 may remain empty, but this is not preferred.

The portion of the reservoir layer impregnated with matrix material will have a somewhat reduced pore size which will be similar to that of the electrolyte matrix 16. It will be the first portion of the reservoir layer to fill with excess electrolyte and aids in the distribution of excess electrolyte throughout the surrounding hydrophilic regions of the reservoir layer.

Since impregnation of the reservoir layer with matrix material somewhat reduces the pore size and thus the volume of electrolyte which can be stored, it is preferred that less than half of the hydrophilic portion 41 be impregnated. Furthermore, in this embodiment the impregnation of matrix material extends to the surface 40 to aid wicking of liquid from the fuel space to the matrix 16. This is preferred but not required, and the invention is not to be construed as limited thereto.

It should be understood that the matrix 16 may include a binder as well as the basic matrix material. For example, a typical silcon carbide matrix composition may be 96% silicon carbide powder plus 4% PTFE binder, such as described in copending commonly owned U.S. patent application Ser. No. 609,867 filed on Sept. 2, 1975. Impregnation of the reservoir layer with the matrix material preferably includes only enough binder to keep the material in the reservoir layer during operation. This may be less binder than used in the matrix itself.

One way of making the reservoir layer 32 is to mask the areas 37 of the surface 34 and apply an aqueous solution of the hydrophobic material to the nonmasked areas, such as by screen printing. For example, if the reservoir layer is carbon paper having a thickness of 13 mils, a mean pore size of 41 microns, and 75% of its pores have a size of from 19–85 microns, the printing ink may have a composition consisting of 225 grams TFE-30, 265 grams of a 2% aqueous solution of Carbopol 934, 500 grams $H_2O$ and 8 ml $NH_4OH$ 28% solution. TFE-30 is made by Dupont and comprises about 60% polytetrafluoroethylene, 34% $H_2O$ and 6% surfactant, by weight. Carbopol 934 is a powder made by B. F. Goodrich; when mixed with $NH_4OH$, a neutralizing agent, a neutral salt is formed which is the thickening agent. The $NH_4OH$ is added after the other ingredients have been combined and stirred so that air bubbles are not present.

The columns 38 could be similarly printed using a less viscous ink by masking the appropriate areas of the surface 40. For example, assuming the same carbon paper substrate as mentioned above, the ink may have a composition consisting of 625 grams TFE-30, 660 grams of a 2% aqueous solution of Carbopol 934, 1190 grams $H_2O$ and 20 ml $NH_4OH$ 28% solution.

Impregnating the reservoir layer with matrix material 42 may also be done by screen printing, but may require printing from the gas facing surface 40 as well as from the catalyst facing surface 34. An ink composition which may be used for this purpose to impregnate the carbon paper mentioned above consists of 1800 grams of a 1% aqueous solution of polyethylene oxide such as Polyox made by Union Carbide Corporation, 2980 grams Sika I 1000 grit green siliton carbide powder from Carborundum Co., 700 grams Teflon 3170 which is an aqueous suspension of polytetrafluoroethylene plus surfactant made by Dupont, and 355 ml $H_2O$. The holes 44 can be filled by the screen printing process after the catalyst layer has been applied to the surface 34.

When screen printing is used, the depth to which the ink solution inpregnates the reservoir layer is controlled by the viscositu of the ink and the number of passes made during the screen printing process. Inking vehicles and other undesirable volatile ingredients such as surfactants are subsequently volatilized during sintering of the catalyst layer.

Although in the embodiment of FIG. 1 the reservoir layer 32 acts as a substrate for the catalyst layer 30 which may be applied thereto such as by spraying, filtering, printing or other suitable means, it should be apparent to those having ordinary skill in the art that the matrix 16 may be used as the catalyst layer substrate rather than the reservoir layer 32. Thus, the catalyst layer 30 may be applied and bonded to the matrix 16 and simply be in intimate contact with but not bonded to the surface 34 of the reservoir layer.

As will also be obvious to those having ordinary skill in the art, the substrate 26 of the cathode electrode 14 may be replaced by a reservoir layer similar to or identical to the reservoir layer 32. However, this additional reservoir volume is usually not required. If only a single reservoir layer is to be used, it is preferred that it be on the anode side of the cell since the anode is more tolerant to reduced availability of hydrogen than the cathode is to reduced availability of oxygen.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the U.S. is:

1. An electrolyte reservoir layer for use adjacent the catalyst layer of a fuel cell, said reservoir layer being porous and including a catalyst facing surface and a noncatalyst facing surface, said catalyst facing surface including first impregnations of hydrophobic material to a shallow depth over a major portion of its area, said catalyst facing surface also including uniformly distributed areas not impregnated with hydrophobic material, said reservoir layer also including uniformly distributed nonelectrolyte retaining portions leading from said noncatalyst facing surface to said impregnations of hydrophobic material at said other surface, said nonelectrolyte retaining portions comprising only a small portion of the volume of said reservoir layer, said reservoir layer being hydrophilic in all portions other than said nonelectrolyte retaining portions and said first impregnations, said reservoir layer also including impregnations of an electrolyte retaining matrix material extending from said areas of said catalyst facing surface not impregnated with hydrophobic material into said hydrophilic portions, said matrix material impregnating less than half of said hydrophilic portions.

2. The reservoir layer according to claim 1 wherein said nonelectrolyte retaining portions are second impregnations of hydrophobic material extending from said noncatalyst facing surface to said first impregnations of hydrophobic material.

3. The reservoir layer according to claim 2 wherein said impregnation of matrix material extends from said catalyst facing surface to said noncatalyst facing surface.

4. The reservoir layer according to claim 1 wherein the area of said catalyst facing surface not impregnated with hydrophobic material is at least 2% of the total area of said catalyst facing surface, said depth of said first impregnations is no more than 50% of the thickness of said reservoir layer and no less than 3 mils, and the minimum total cross-sectional area of said nonelectrolyte retaining portions is 2% of the total cross-sectional area of said noncatalyst facing surface.

5. The electrolyte reservoir layer according to claim 4 wherein said reservoir layer comprises carbon paper.

6. The electrolyte reservoir layer according to claim 4 wherein said matrix material comprises silicon carbide.

7. A fuel cell electrode comprising an electrolyte reservoir layer and a catalyst layer, said catalyst layer including hydrophobic material, said reservoir layer being porous throughout and including a catalyst facing surface and a noncatalyst facing surface, said catalyst facing surface including first impregnations of hydrophobic material to a shallow depth over a major portion of its area, said catalyst facing surface also including uniformly distributed areas not impregnated with hydrophobic material, said reservoir layer further including uniformly distributed nonelectrolyte retaining portions leading from said noncatalyst facing surface to said impregnations of hydrophobic material at said other surface, said nonelectrolyte retaining portions comprising only a small portion of the volume of said reservoir layer, said reservoir layer being hydrophilic in all portions other than said nonelectrolyte retaining portions and said first impregnations, said reservoir layer including impregnations of an electrolyte retaining matrix material extending from said areas of said catalyst facing surface not impregnated with hydrophobic material into said hydrophilic portions, said matrix material impregnating less than half of said hydrophilic portions, said catalyst layer being bonded to said catalyst facing surface and including holes therethrough in communication with said impregnations of electrolyte retaining matrix material.

8. The fuel cell electrode according to claim 7 wherein said impregnations of matrix material extend from said catalyst facing surface to said noncatalyst facing surface.

9. The fuel cell electrode according to claim 7 wherein said area of said catalyst facing surface not impregnated with hydrophobic material is at least 2% of the total area of said catalyst facing surface, said depth of said first impregnations is no more than 50% of the thickness of said reservoir layer and no less than 3 mils, and the minimum total cross-sectional area of said nonelectrolyte retaining portions is 2% of the total cross-sectional area of said noncatalyst facing surface.

10. In a fuel cell comprising an electrolyte retaining matrix, an anode catalyst layer disposed on one side of and in contact with said matrix and a cathode catalyst layer disposed on the other side of and in contact with said matrix each of said catalyst layers including hydrophobic material, the improvement comprising:

an electrolyte reservoir layer in contact with the nonmatrix facing side of at least one of said catalyst layers, said reservoir layer being porous throughout and including a catalyst facing surface and a noncatalyst facing surface, said catalyst facing surface including first impregnations of hydrophobic material to a shallow depth over a major portion of its area, said catalyst facing surface also including uniformly distributed areas not impregnated with hydrophobic material, said reservoir layer also including second impregnations of hydrophobic material leading from said noncatalyst facing surface to said first impregnations of hydrophobic material, said second impregnations comprising only a small portion of the volume of said reservoir layer, said reservoir layer being hydrophilic in all portions other than said first and second impregnations, said reservoir layer including third impregnations of a material essentially the same as the material of said matrix, said third impregnations extending from said areas of said catalyst facing surface not impregnated with hydrophobic material into said hydrophilic portions, said third impregnations impregnating less than half of said hydrophilic portions, said hydrophilic portions having substantially no pores smaller than the largest pores of said matrix.

11. The improvement according to claim 10 wherein said one catalyst layer is said anode catalyst layer.

12. The improvement according to claim 11 wherein said anode catalyst layer is bonded to said reservoir layer.

13. The improvement according to claim 11 wherein said catalyst layer includes a plurality of uniformly distributed holes therethrough aligned with said third impregnations, said holes being filled with essentially the same material of which said matrix is made.

14. The improvement according to claim 13 wherein said reservoir layer comprises carbon paper.

15. The improvement according to claim 14 wherein said matrix comprises silicon carbide with a hydrophobic polymer binder.

16. The improvement according to claim 12 wherein said areas of said catalyst facing surface not impregnated with hydrophobic material are at least 2% of the total area of said catalyst facing surface, said depth of said first impregnations are no more than 50% of the thickness of said reservoir layer and no less than 3 mils, and the minimum total cross-sectional area of said second impregnations is 2% of the total cross-sectional area of said noncatalyst facing surface.

17. The improvement according to claim 16 wherein said third impregnations extend from said catalyst facing surface to said noncatalyst facing surface.

* * * * *

UNITED STATES PATENT OFFICE
CERTIFICATE OF CORRECTION

PATENT NO. : 4,038,463
DATED : 7/26/77
INVENTOR(S) : John H. Lamarine et al.

It is certified that error appears in the above-identified patent and that said Letters Patent are hereby corrected as shown below:

Column 5, line 53, "inclludes" should read --includes--.

Column 6, line 7, after "should" insert --also--.

Column 6, line 50, "2980" should read --2940--.

Column 6, line 51, "siliton" should read --silicon--.

Column 6, line 59, "viscositu" should read --viscosity--.

Signed and Sealed this

First Day of November 1977

[SEAL]

Attest:

RUTH C. MASON
Attesting Officer

LUTRELLE F. PARKER
Acting Commissioner of Patents and Trademarks